(12) United States Patent
Chardon

(10) Patent No.: US 7,422,176 B2
(45) Date of Patent: Sep. 9, 2008

(54) METHOD FOR ENSURING THE SAFETY OF AN AIRCRAFT FLYING HORIZONTALLY AT LOW SPEED

(75) Inventor: Stéphane Chardon, Toulouse (FR)

(73) Assignee: AIRBUS France, Toulouse (FR)

( * ) Notice: Subject to any disclaimer, the term of this patent is extended or adjusted under 35 U.S.C. 154(b) by 493 days.

(21) Appl. No.: 11/099,675

(22) Filed: Apr. 6, 2005

(65) Prior Publication Data

US 2005/0269448 A1    Dec. 8, 2005

(30) Foreign Application Priority Data

Apr. 9, 2004    (FR) ................... 04 03762

(51) Int. Cl.
*B64C 13/16* (2006.01)
(52) U.S. Cl. .............. 244/76 R; 244/186; 244/194; 701/8
(58) Field of Classification Search .......... 244/76 R, 244/186, 191, 194, 195; 701/5, 8, 9
See application file for complete search history.

(56) References Cited

U.S. PATENT DOCUMENTS

| | | | | |
|---|---|---|---|---|
| 4,590,475 A | * | 5/1986 | Brown | ................. 340/966 |
| 4,764,872 A | * | 8/1988 | Miller | ................. 701/3 |
| 4,967,363 A | | 10/1990 | Bonafe | |
| 5,031,102 A | * | 7/1991 | Robbins et al. | ................. 701/5 |
| 5,079,711 A | * | 1/1992 | Lambregts et al. | ................. 701/3 |
| 5,386,954 A | | 2/1995 | Bissey et al. | |
| 5,836,546 A | * | 11/1998 | Gast | ................. 244/76 B |
| 5,884,870 A | | 3/1999 | Maffre et al. | |

FOREIGN PATENT DOCUMENTS

| | | |
|---|---|---|
| FR | 2624964 | 6/1989 |
| FR | 2688077 | 9/1993 |
| FR | 2747204 | 10/1997 |

OTHER PUBLICATIONS

Preliminary Search Report dated Nov. 10, 2004 with English translation.

* cited by examiner

*Primary Examiner*—John W Eldred
(74) *Attorney, Agent, or Firm*—Dickinson Wright, PLLC

(57) ABSTRACT

A method for ensuring the safety of an aircraft flying horizontally at low speed includes determining a lower speed threshold for the aircraft, measuring the actual speed of the aircraft and comparing the actual speed with the threshold. When the actual speed reaches the threshold in the decreasing direction, the diving command of the aircraft is limited to a load factor (fg) greater than 0g.

According to the invention:
  a lower speed threshold is determined for the aircraft;
  the actual speed of the said aircraft is measured; and
  the said actual speed is compared with the said threshold and, when the said actual speed reaches the said threshold in the decreasing direction, the diving command of the said aircraft is limited to a load factor (fg) greater than 0 g.

6 Claims, 3 Drawing Sheets

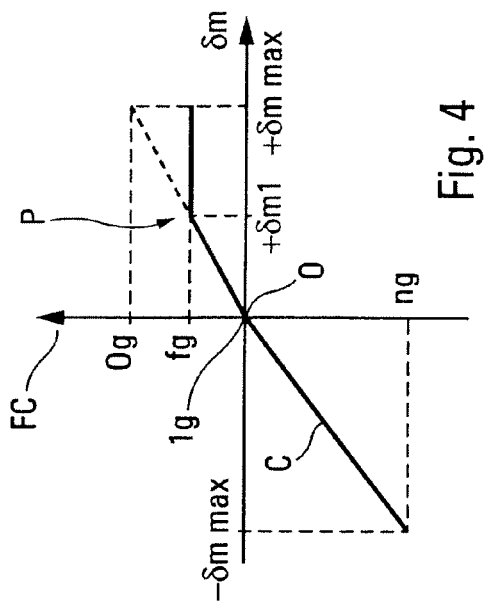
Fig. 4
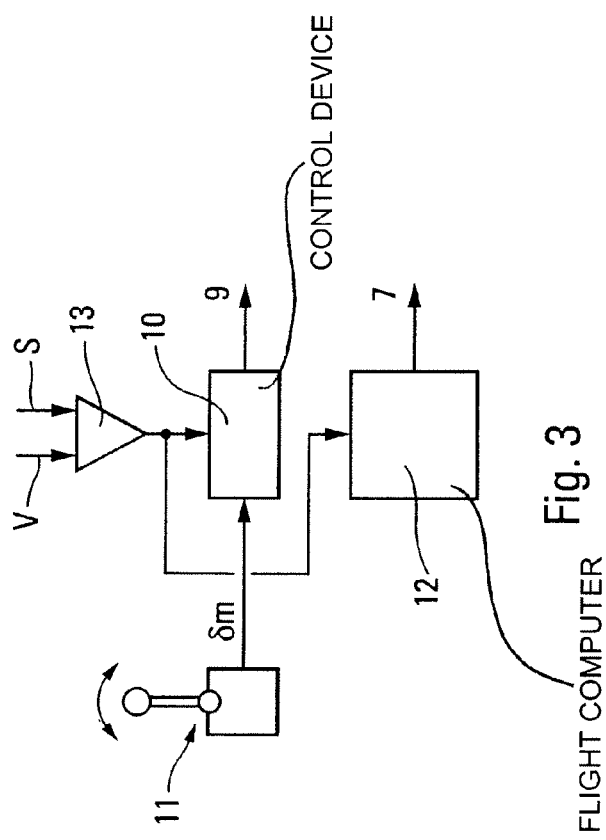
Fig. 3
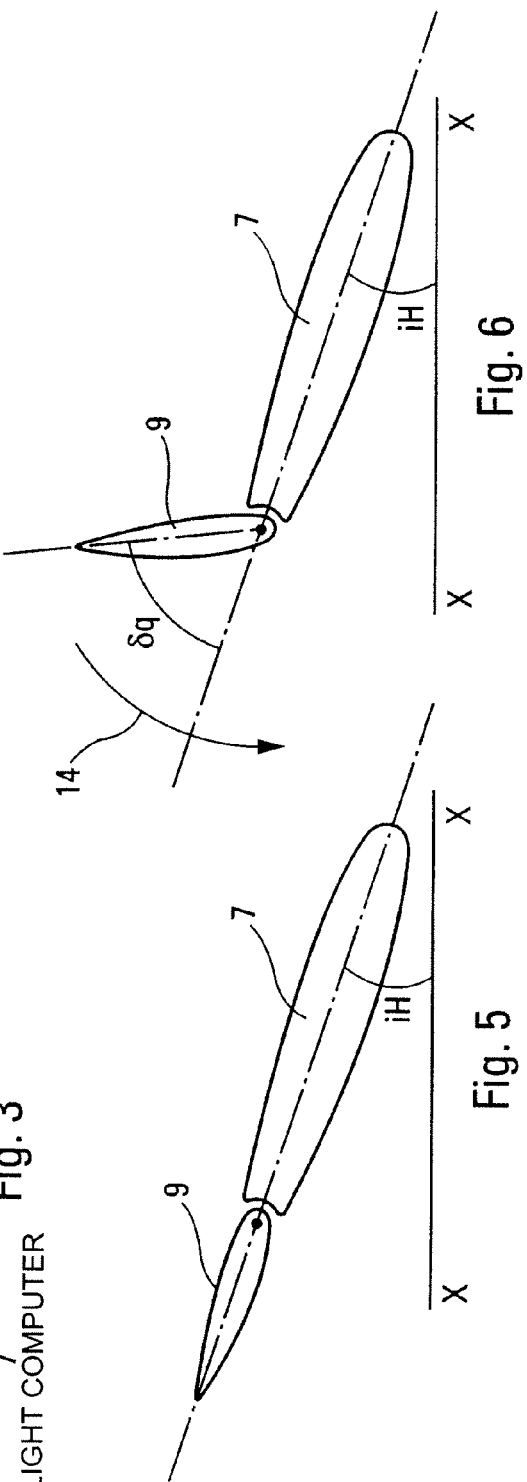
Fig. 5
Fig. 6

METHOD FOR ENSURING THE SAFETY OF AN AIRCRAFT FLYING HORIZONTALLY AT LOW SPEED

FIELD OF THE INVENTION

The present invention relates to a method of ensuring the safety of an aircraft flying horizontally at a low speed, close to the minimum speed (Lower Selectable Speed) VLS authorized for the actual configuration of the movable aerodynamic surfaces (slats and/or trailing edge flaps) of its wings.

BACKGROUND OF THE RELATED ART

It is known that, in such a stabilized low speed flight phase, the lift provided for the aircraft by its wings and by the said movable aerodynamic surfaces must be high, such that this high lift (possibly strengthened by the blowing over the wings by the propellers of the engines and possibly aided by the traction force of the latter) generates a high diving moment with respect to the center of gravity of the aircraft.

In order to trim the aircraft, the pilot deflects the elevators of the said aircraft to pitch-up, in such a way that the latter generate, with respect to the said center of gravity of the aircraft, a pitch-up moment capable of counteracting the said high diving moment.

However, if during such a stabilized low speed flight phase the aircraft has to suddenly avoid another aircraft by flying under it in order to avoid a collision, the pilot suddenly sets the elevators to full dive. Then, after the avoidance, the elevators are again returned, from their full dive position, to a pitch-up position allowing the aircraft to carry out a pull-out.

It will easily be understood that the success of such a maneuver requires a large sizing of the said elevators and of their actuating means, which are generally hydraulic.

SUMMARY OF THE INVENTION

The purpose of this invention is to overcome this disadvantage.

For this purpose, according to the invention, the method for ensuring the safety of an aircraft flying horizontally at low speed, close to the minimum speed VLS authorized for the actual configuration of the movable aerodynamic surfaces of its wings, the pitch control of the said aircraft being obtained in the usual manner by action of the pilot on the elevators articulated on the tailplane of the said aircraft, is noteworthy in that:

a lower speed threshold is determined for the aircraft;
the actual speed of the said aircraft is measured; and
the said actual speed is compared with the said threshold and, when the said actual speed reaches the said threshold in the decreasing direction, the diving command of the said aircraft is limited to a load factor greater than 0 g.

The present invention is based on the observation that, in particular due to the inertia of the aircraft, it is not necessary, in order to succeed in the avoidance maneuver described above, to reach load factors close to 0 g (full dive authorization), but that it suffices to command higher load factors, for example within the range 0.3 g to 0.7 g and preferably 0.5 g.

Because of such a load factor limitation, it is therefore possible to avoid oversizing the elevators and their actuating means.

Moreover, it is known that certain aircraft comprise a stabilizing tailplane with adjustable inclination. Such an adjustable tailplane is, in the art, referred to by one or other of the abbreviations PHR (for Plan Horizontal Réglable) or THS (or Trimmable Horizontal Stabilizer). In this case, the elevators form the trailing edge of the said adjustable tailplane and are articulated on the latter.

An adjustable tailplane can be deflected in the pitch-up or diving direction and it is used, among other applications, for trimming the aircraft in stabilized flight (the elevators generally being in aerodynamic alignment with the said adjustable tailplane) by generating a pitch-up moment counteracting the diving moment, principally due to the lift (as described above).

In the low speed flight phase relevant to the present invention, this trimming pitch-up moment must therefore be high, such that the local incidence on the said adjustable tailplane is highly negative. The result of this is that, during the underflying avoidance maneuver mentioned above, the local incidence of the said adjustable tailplane risks exceeding the stalling incidence of the latter, such that, at the moment when the pilot wishes to stop the maneuver and set the elevators to pitch-up, it will be possible for the adjustable tailplane to have lost its effectiveness: the aircraft will therefore be incapable of starting the pull-out and this can result in the loss of the aircraft. Here again, because of the above-mentioned avoidance maneuver, the sizing of the said adjustable tailplane must be bigger than that which is strictly necessary for the other flight phases of the aircraft.

In order to avoid such an over-sizing, according to the invention and in addition to the diving load factor limitation mentioned above, the pitch-up inclination of the said adjustable tailplane is blocked at the value existing at the moment when the said actual speed of the aircraft reaches the said lower speed threshold in a decreasing direction.

Thus, during the stabilized low speed flight phase, the horizontal trimming of the aircraft also brings the elevators into action in the pitch-up direction, as soon as the lower speed threshold is reached. The local incidence on the adjustable tailplane is therefore less negative, such that there is a higher non-stalling safety margin of the latter during the avoidance maneuver.

After blocking the pitch-up inclination of the said adjustable tailplane, it is advantageous that the latter can be freely commanded in the dive direction if necessary.

Advantageously, the said lower speed threshold can be chosen to be equal to the said minimum speed VLS.

BRIEF DESCRIPTION OF THE DRAWINGS

The figures of the appended drawing will give a good understanding of how the invention can be embodied. In these figures, identical references refer to similar elements.

FIG. 3 is a simplified block diagram of the controls of the adjustable tailplane and of the elevators of the aircraft shown in FIGS. 1 and 2.

FIG. 4 is a schematic diagram showing the variation of the load factor to which the aircraft shown in FIGS. 1 and 2 is subjected as a function of the pitch piloting command.

FIG. 5 shows the positions of the adjustable tailplane and of the elevators in normal stabilized flight of the aircraft shown in FIGS. 1 and 2.

FIG. 6 shows the positions of the adjustable tailplane and of the elevators in stabilized flight according to the invention, after reaching the lower speed threshold.

DETAILED DESCRIPTION OF THE INVENTION

Figure 1:
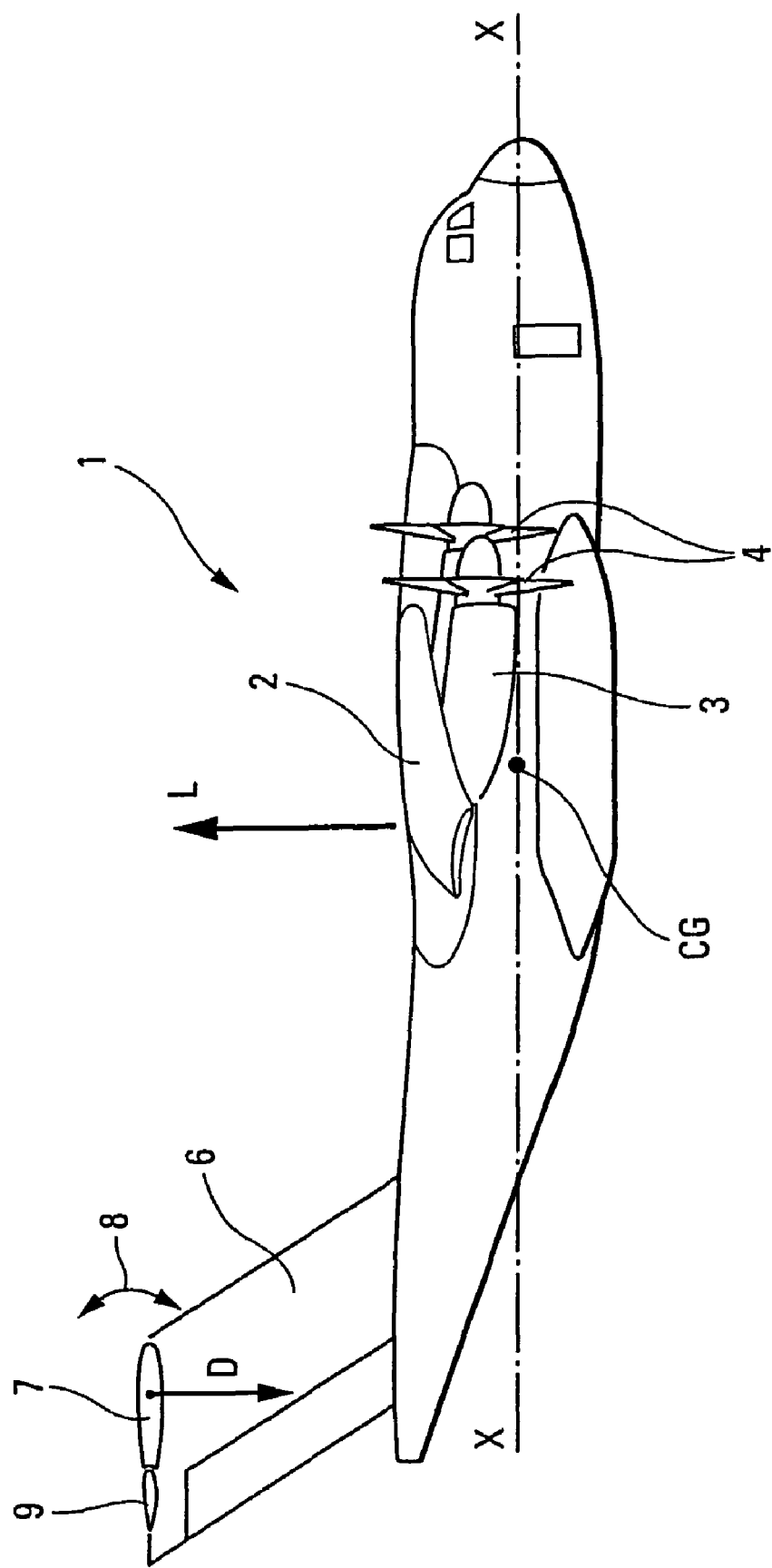
FIG. 1 is a side view, in flight, of an aircraft to which the present invention can be applied.
Figure 2:
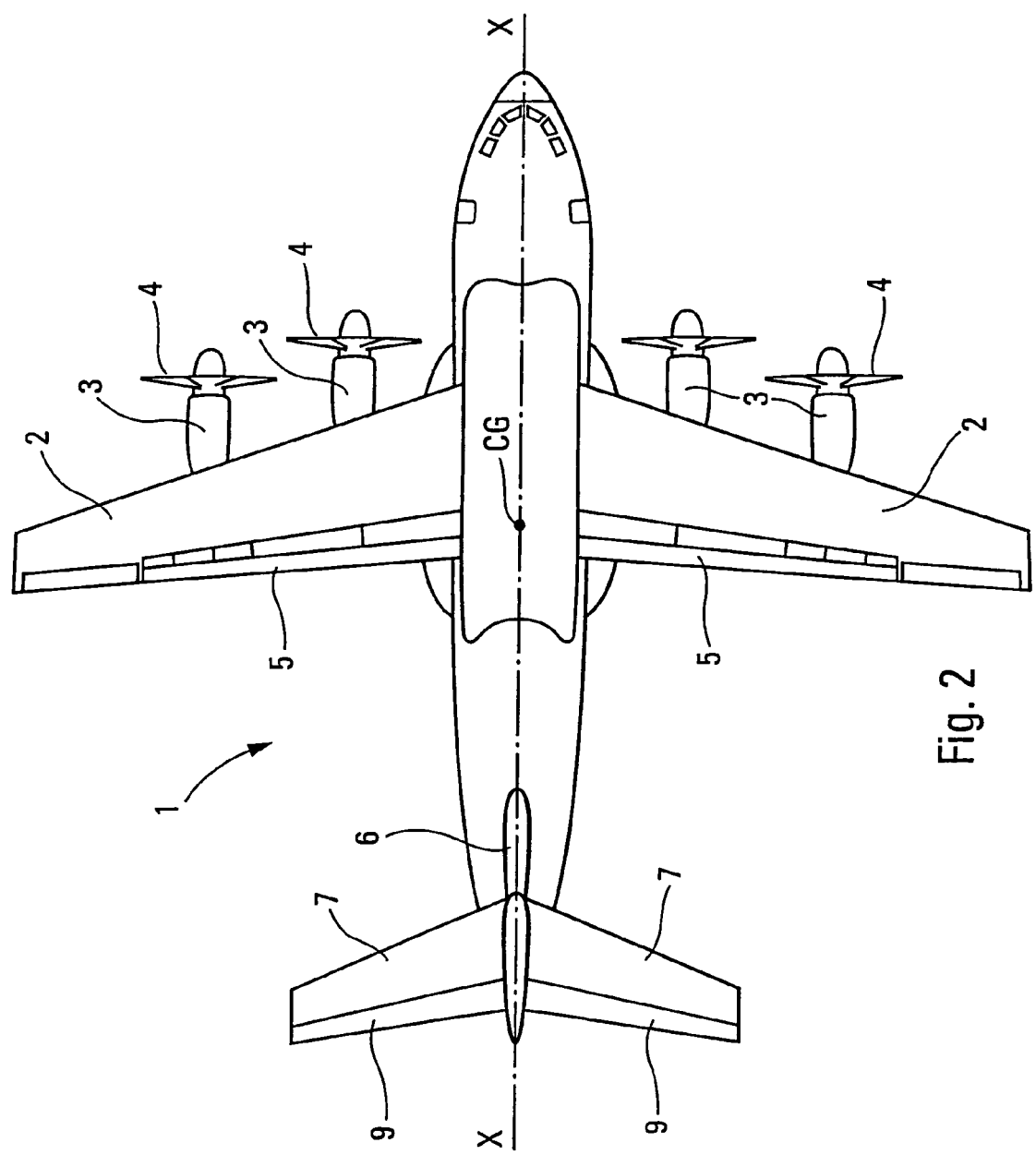
FIG. 2 is a plan view of the aircraft shown in FIG. 1.

The transport aircraft 1, shown diagrammatically in FIGS. 1 and 2, has a longitudinal axis X-X and comprises two symmetrical wings 2 each carrying two engines 3 with propellers 4. The trailing edges of the wings 2 are provided with articulated flaps 5.

At its rear section, the aircraft 1 is provided with a vertical tail unit 6 carrying, at its upper end, a tailplane 7, adjustable in inclination as illustrated by the double arrow 8 in FIG. 1. The trailing edge of the adjustable tailplane 7 consists of elevators 9 articulated on the latter.

As illustrated schematically in FIG. 3, the deflection of the elevators 9 is controlled by a control device 10 receiving a control command δm from a joystick system 11, available to the pilot of the aircraft 1, whereas the deflection of the adjustable tailplane 7 is controlled by a flight computer 12 which, even though not shown, also receives the control command δm.

The load factor FC applied to the aircraft as a function of the control command δm (see FIG. 4) comprises in the usual manner a pitch-up section C, for which the load factor FC varies between 1 g and ng (with n being of the order of 2 or 3) for a variation of δm between 0 and a maximum −δmmax, and a diving section P, for which the said load factor FC varies between 1 g and 0 g for a variation of am between 0 and a maximum +δmmax. In FIG. 4, the usual diving section P is shown partially in full line (from the point 0.1 g to the point +δml, fg) and partially in dotted line (from the point +δml, fg to the point +δmmax, 0 g).

In stabilized flight, the diving moment exercised by the lift L of the wings 2, possibly strengthened by other forces, with respect to the center of gravity CG is balanced by the pitch-up moment generated by the negative lift D of the adjustable tailplane 7 with respect to the said center of gravity G. In this case, as illustrated in FIG. 5, the said adjustable tailplane 7 is inclined in the pitch-up direction by an angle iH with respect to the axis X-X and the elevators 9 are advantageously in aerodynamic alignment with the said adjustable tailplane 7.

The control device 10 comprises, in addition to the elements 10, 11 and 12 already described, a comparison device 13 receiving the actual speed V of the aircraft 1 and a lower speed threshold S, for example equal to VLS. The comparison device 13, although shown as separate from the control device 10 and from the flight computer 12, could be incorporated in one and/or the other of the latter two devices. Similarly, it follows that the control device 10 and the flight computer 12 can be grouped in one and the same computer.

As long as the actual speed V is greater than the threshold S, the comparison device 13 has no effect on the control device 10, nor on the flight computer 12 and the adjustable tailplane 7 and the elevators 9 are in the position shown in FIG. 5.

On the other hand, as soon as the actual speed V reaches the threshold S in a decreasing direction, the comparison device 13:

on the one hand, by the intermediary of the flight computer 12, blocks the adjustable tailplane 7 in the pitch-up direction, the pitch-up angle of inclination iH being equal to the value that it had at the time when the actual speed V became equal to the threshold S such that, from that time onwards, the trimming of the aircraft 1 is also provided by the elevators 9 (as shown in FIG. 6) which assist in counteracting the diving moment due to the lift L; and on the other hand, by the intermediary of the control device 10, limits the diving load factor FC of the aircraft 1 to a fraction f of g, where f is between 0.3 and 0.7, for example equal to 0.5, such that, as shown in FIG. 4, the load factor FC is equal to fg between the dive command +δml (which corresponds to fg) and the maximum dive command +δmmax. Thus, when the pilot moves the joystick system 11 to the full dive position for a sudden under-flying avoidance, the elevators will pivot in the diving direction, as symbolized in FIG. 6 by the arrow 14, whilst preventing imposing a zero or near-zero (0 g) load factor on the aircraft.

As mentioned above, due to the measures that have just been described, the necessity of over-sizing the adjustable tailplane 7 and the elevators 9 solely for the low speed under-flying avoidance maneuver is avoided.

The invention claimed is:

1. A method for ensuring the safety of an aircraft flying horizontally at low speed, close to the minimum speed VLS authorized for actual configuration of movable aerodynamic surfaces of its wings, pitch control of said aircraft being obtained by action of the pilot on elevators articulated on a tailplane of said aircraft, the method comprising:
    determining a lower speed threshold (S) for the aircraft;
    measuring the actual speed (V) of said aircraft; and
    comparing said actual speed (V) with said threshold (S) and, when said actual speed (V) reaches said threshold (S) in the decreasing direction, the diving command of said aircraft (1) is limited to a load factor (fg) greater than 0 g.

2. The method as claimed in claim 1, wherein the load factor (fg) resulting from the diving command limitation is within the range 0.3 g to 0.7 g.

3. The method as claimed in claim 2, wherein the load factor (fg) resulting from the diving command limitation is of the order to 0.5 g.

4. The method as claimed in claim 1 for an aircraft in which said tailplane is adjustable in inclination, wherein the pitch-up inclination of said adjustable tailplane is blocked at the value existing at the moment when said actual speed of the aircraft reaches said lower speed threshold in a decreasing direction.

5. The method as claimed in claim 4, wherein, after blocking the pitch-up inclination of said adjustable tailplane, the latter can be freely controlled in the diving direction.

6. The method as claimed in claim 1, wherein said speed threshold is chosen to be equal to said minimum speed VLS.

* * * * *